(12) United States Patent
Chung et al.

(10) Patent No.: US 9,831,908 B2
(45) Date of Patent: Nov. 28, 2017

(54) TELECOMMUNICATIONS METHODS FACILITATING SHARING OF SPREADING CODES

(71) Applicant: MEDIATEK INC., Hsin-Chu (TW)

(72) Inventors: Pei-Shiun Chung, New Taipei (TW); Xiu-Sheng Li, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 13/798,145

(22) Filed: Mar. 13, 2013

(65) Prior Publication Data

US 2013/0322494 A1    Dec. 5, 2013

Related U.S. Application Data

(60) Provisional application No. 61/653,621, filed on May 31, 2012.

(51) Int. Cl.
*H04B 1/00* (2006.01)
*H04B 1/707* (2011.01)
*H04J 13/00* (2011.01)

(52) U.S. Cl.
CPC .......... *H04B 1/707* (2013.01); *H04J 13/0003* (2013.01)

(58) Field of Classification Search
CPC ........................ G06F 3/0484; G06F 3/04842
See application file for complete search history.

(56) References Cited

U.S. PATENT DOCUMENTS

| 6,434,131 | B1* | 8/2002 | Sari ............... H04B 1/71075 370/208 |
| 6,985,471 | B1* | 1/2006 | Holma ............... H04B 7/264 370/335 |
| 2004/0047330 | A1* | 3/2004 | Matsuno ............ H04B 1/707 370/342 |
| 2004/0100941 | A1* | 5/2004 | Lim ............... H04B 7/1858 370/349 |
| 2004/0120289 | A1* | 6/2004 | Hamalainen ........ H04B 7/2628 370/335 |
| 2005/0243896 | A1* | 11/2005 | Yuan ............... H04J 13/00 375/146 |

(Continued)

FOREIGN PATENT DOCUMENTS

| CN | 1314035 A | 9/2001 |
| CN | 1379600 A | 11/2002 |
| CN | 1918820 A | 2/2007 |

OTHER PUBLICATIONS

Kumar et al, "A New Overloading Scheme for Cellular DS-CDMA using Orthogonal Gold Codes", 2008, IEEE, pp. 1042-1046.*

(Continued)

*Primary Examiner* — Shuwang Liu
*Assistant Examiner* — Gina McKie
(74) *Attorney, Agent, or Firm* — Winston Hsu

(57) ABSTRACT

Embodiments of the invention provide telecommunications methods that facilitate sharing of spreading codes. According to one of the embodiments, a first telecommunications apparatus first selects a plurality of second telecommunications apparatuses to share at least one spreading code. Then, the first telecommunications apparatus uses each of the at least one spreading code to perform spreading operations for the second telecommunications apparatuses by turns repetitively.

9 Claims, 8 Drawing Sheets

| C(128, 0) | $U_0$ | $U_1$ | $U_2$ | $U_3$ | $U_4$ | $U_0$ | $U_1$ | $U_2$ | $U_3$ | $U_4$ | ... |
| C(128, 1) | $U_4$ | $U_0$ | $U_1$ | $U_2$ | $U_3$ | $U_4$ | $U_0$ | $U_1$ | $U_2$ | $U_3$ | ... |
| C(128, 2) | $U_3$ | $U_4$ | $U_0$ | $U_1$ | $U_2$ | $U_3$ | $U_4$ | $U_0$ | $U_1$ | $U_2$ | ... |
| C(128, 3) | $U_2$ | $U_3$ | $U_4$ | $U_0$ | $U_1$ | $U_2$ | $U_3$ | $U_4$ | $U_0$ | $U_1$ | ... |
| . | | | | | | | | | | | |
| . | | | | | | | | | | | |
| C(128, 124) | $U_{155}$ | $U_{156}$ | $U_{157}$ | $U_{158}$ | $U_{159}$ | $U_{155}$ | $U_{156}$ | $U_{157}$ | $U_{158}$ | $U_{159}$ | ... |
| C(128, 125) | $U_{159}$ | $U_{155}$ | $U_{156}$ | $U_{157}$ | $U_{158}$ | $U_{159}$ | $U_{155}$ | $U_{156}$ | $U_{157}$ | $U_{158}$ | ... |
| C(128, 126) | $U_{158}$ | $U_{159}$ | $U_{155}$ | $U_{156}$ | $U_{157}$ | $U_{158}$ | $U_{159}$ | $U_{155}$ | $U_{156}$ | $U_{157}$ | ... |
| C(128, 127) | $U_{157}$ | $U_{158}$ | $U_{159}$ | $U_{155}$ | $U_{156}$ | $U_{157}$ | $U_{158}$ | $U_{159}$ | $U_{155}$ | $U_{156}$ | ... |

(56) References Cited

U.S. PATENT DOCUMENTS

2005/0265496 A1* 12/2005 Johansson .............. H04B 1/712
                                                              375/347
2008/0261610 A1* 10/2008 Villier ........................ 455/452.1
2010/0103904 A1*  4/2010 Jou et al. ...................... 370/331
2012/0039270 A1*  2/2012 Nguyen ................ H04J 11/003
                                                              370/329

OTHER PUBLICATIONS

Sari et al, "Increasing the Capacity of CDMA Using Hybrid Spreading Sequences and Iterative Multistage Detection", 1999, IEEE, pp. 1160-1164.*

* cited by examiner

| C(128, 0) | C(128, 1) | C(128, 2) | C(128, 3) | ... | C(128, 124) | C(128, 125) | C(128, 126) | C(128, 127) |
|---|---|---|---|---|---|---|---|---|
| $U_4$ | $U_3$ | $U_4$ | $U_0$ | | $U_{157}$ | $U_{158}$ | $U_{159}$ | $U_{155}$ |
| $U_3$ | $U_2$ | $U_1$ | $U_4$ | | $U_{158}$ | $U_{157}$ | $U_{156}$ | $U_{159}$ |
| $U_2$ | $U_4$ | $U_0$ | $U_1$ | | $U_{158}$ | $U_{159}$ | $U_{155}$ | $U_{156}$ |
| $U_1$ | $U_0$ | $U_2$ | $U_3$ | | $U_{156}$ | $U_{155}$ | $U_{157}$ | $U_{158}$ |
| $U_0$ | $U_1$ | $U_3$ | $U_2$ | | $U_{159}$ | $U_{156}$ | $U_{158}$ | $U_{157}$ |
| $U_4$ | $U_3$ | $U_2$ | $U_0$ | | $U_{159}$ | $U_{158}$ | $U_{157}$ | $U_{155}$ |
| $U_3$ | $U_1$ | $U_0$ | $U_2$ | | $U_{158}$ | $U_{156}$ | $U_{155}$ | $U_{157}$ |
| $U_2$ | $U_0$ | $U_1$ | $U_4$ | | $U_{157}$ | $U_{155}$ | $U_{156}$ | $U_{159}$ |
| $U_1$ | $U_2$ | $U_4$ | $U_3$ | | $U_{156}$ | $U_{157}$ | $U_{159}$ | $U_{158}$ |
| $U_0$ | $U_4$ | $U_3$ | $U_1$ | | $U_{155}$ | $U_{159}$ | $U_{158}$ | $U_{156}$ |

FIG. 6

TELECOMMUNICATIONS METHODS FACILITATING SHARING OF SPREADING CODES

CROSS REFERENCE TO RELATED APPLICATIONS

This application claims the benefit of U.S. provisional application No. 61/653,621, filed on May 31, 2012 and incorporated herein by reference.

BACKGROUND

1. Technical Field

The invention relates generally to telecommunications, and more particularly, to telecommunications methods that facilitate sharing of spreading codes.

2. Related Art

A telecommunications system that adopts the Code Division Multiple Access (CDMA) related technologies, such as the Wideband CDMA (WCDMA) telecommunications technologies, may use a spreading factor (SF) greater than one to accommodate multiple users in a cell. Specifically, if the SF is equal to N, where N is a positive integer greater than one, there may be N spreading codes available under the SF in a cell. The N spreading codes may include C(N, 0), C(N, 1), C(N, 2), . . . , and C(N, N−1), and may be orthogonal to one another. Without using secondary scrambling codes, each of the spreading codes may be allocated to one user exclusively, which may be a piece of user equipment (UE). This allows the system to accommodate up to N users in a cell. In other words, the cell may have an effective code resource of N.

However, sometimes the system may need to accommodate more than N users in a cell, without switching to a greater SF or using secondary scrambling codes.

SUMMARY

An embodiment of the invention provides a telecommunications method performed by a first telecommunications apparatus. According to the embodiment, the first telecommunications apparatus first selects a plurality of second telecommunications apparatuses to share at least one spreading code. Then, the first telecommunications apparatus uses each of the at least one spreading code to perform spreading operations for the second telecommunications apparatuses by turns repetitively.

Another embodiment of the invention provides a telecommunications method performed by a telecommunications apparatus in a spreading code sharing scheme. According to the embodiment, the telecommunications apparatus performs a de-spreading operation using a spreading code, and then pauses performing the de-spreading operation using the spreading code. The telecommunications apparatus repeats the steps of performing the de-spreading operation and pausing performing the de-spreading operation until the telecommunications apparatus leaves the spreading code sharing scheme.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

FIG. 3, FIG. 4, FIG. 5, FIG. 6, and FIG. 7 show several examples illustrating how a plurality of second telecommunications apparatuses may share at least one spreading code.

DETAILED DESCRIPTION

Figure 1:
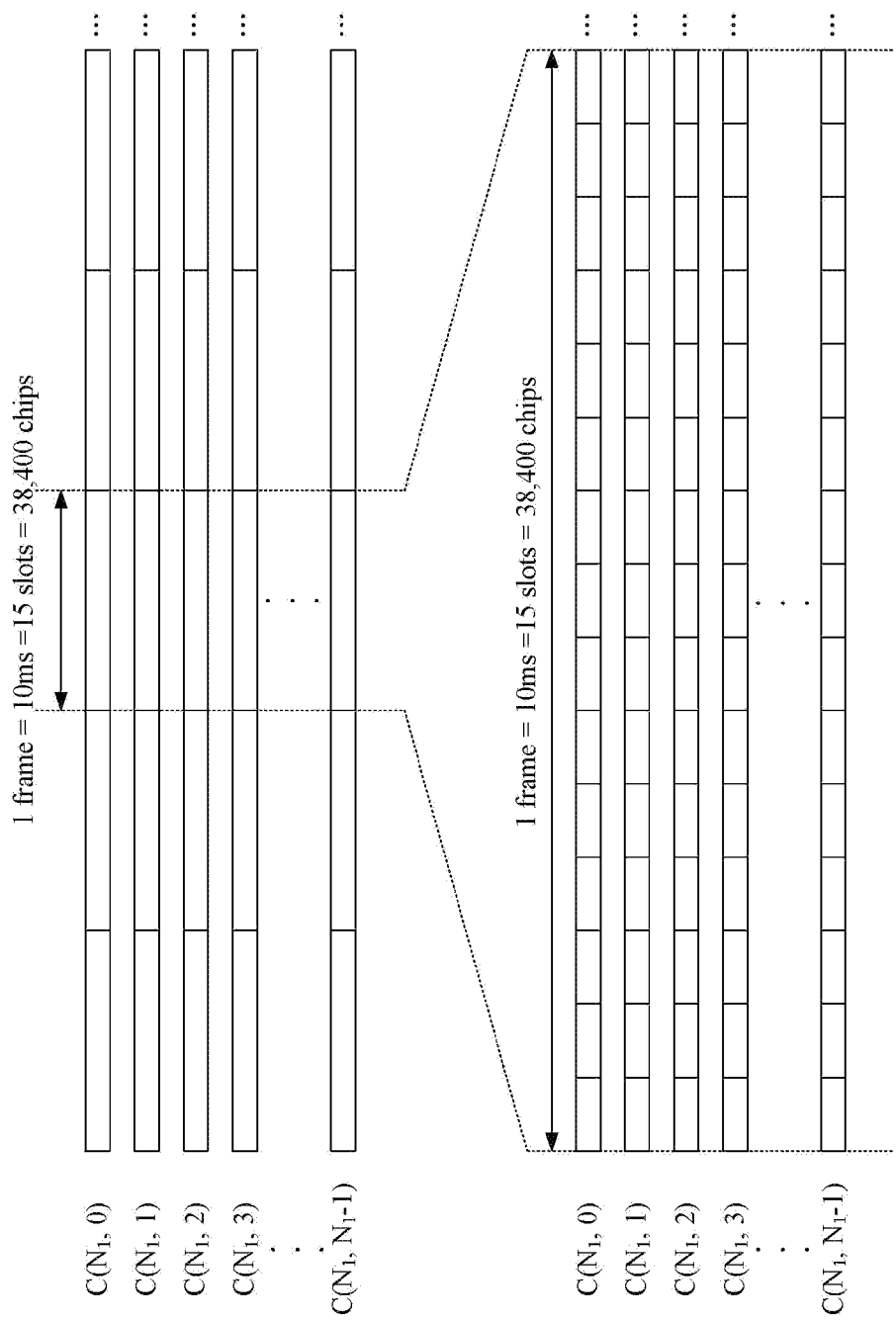
FIG. 1 is a schematic diagram showing the radio frames that a first telecommunications apparatus may transmit to several second telecommunications apparatuses.

FIG. 1 is a schematic diagram showing the radio frames that a first telecommunications apparatus may transmit to several second telecommunications apparatuses. For example, the first telecommunications apparatus and the second telecommunications apparatuses may constitute a part of a CDMA telecommunications system, such as a WCDMA telecommunications system. In other words, the first telecommunications apparatus and the second telecommunications apparatuses may be WCDMA telecommunications apparatuses. Any of the first telecommunications apparatus and the second telecommunications apparatuses may be a Node B, or a piece of user equipment (UE) in the WCDMA telecommunications system. In FIG. 1, the telecommunications system is using a spreading factor of $N_1$, and each of the frames depicted in the figure contains 38,400 chips of spread data and is divided into 15 slots. Each of the slots contains 2,560 chips of spread data.

Because the SF is $N_1$, where $N_1$ is a positive integer greater than one, there may be $N_1$ spreading codes available, including $C(N_1, 0)$, $C(N_1, 1)$, $C(N_1, 2)$, . . . , and $C(N_1, N_1-1)$. If each spreading code is allocated to at most one second telecommunications apparatus, the first telecommunications apparatus may serve at most $N_1$ second telecommunications apparatuses. In other words, the effective code resource is $N_1$.

Figure 2:
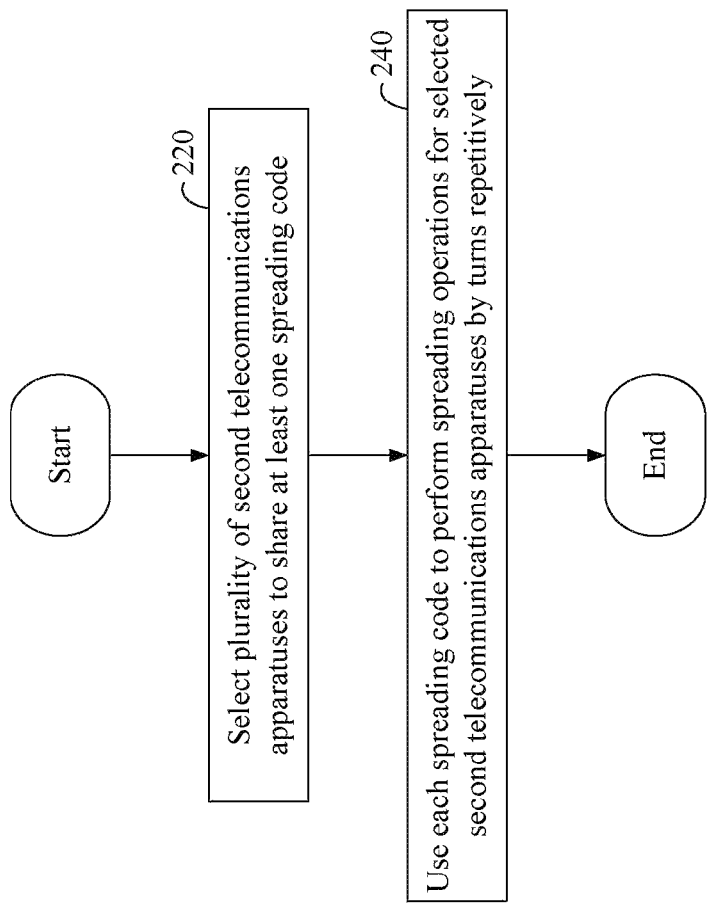
FIG. 2 shows an exemplary flowchart of a method that a first telecommunications apparatus may perform according to an embodiment of the invention.

FIG. 2 shows an exemplary flowchart of a method that the first telecommunications apparatus performs according to an embodiment of the invention. First, at step 220, the first telecommunications apparatus selects a plurality of second telecommunications apparatuses to share at least one spreading code. Specifically, at step 220, the first telecommunications apparatus may select P second telecommunications apparatuses to share Q spreading codes, where P is an integer greater than 1, and Q is an integer greater than 0.

Then, at step 240, the first telecommunications apparatus uses each of the at least one spreading code to perform spreading operations for the selected second telecommunications apparatuses by turns repetitively. Simply speaking, to use a spreading code to perform a spreading operation for a second telecommunications apparatus, the first telecommunications apparatus may multiply each modulated symbol to be provided to the second telecommunications apparatus by the spreading code to generate $N_1$ chips of spread data. Before this, the first telecommunications apparatus may generate each of the modulated symbols using BPSK (binary phase shift keying) or QPSK (Quadrature phase shift keying) modulation. After receiving $N_1$ chips of spread data, the second telecommunications apparatus may divide them by the spreading code to regenerate the original symbol. This operation performed by the second telecommunications apparatus may be referred to as a de-spreading operation.

At any time point, the first telecommunications apparatus may use any of the Q spreading code to perform spreading operations for only one of the P second telecommunications apparatuses. In other words, the P second telecommunications apparatuses may share each of the Q spreading codes in a Time Division Multiplexing (TDM) manner. For any of the Q spreading codes, the P second telecommunications apparatuses may take turns in a regular manner or an irregular manner. Each of the turns may have a fixed duration or a variable duration, and may correspond to at least one slot of 2,560 chips or at least one frame of 38,400 chips.

The Q spreading codes may be selected under a spreading factor $N_1$. In other words, the first telecommunications apparatus may select the Q spreading codes from spreading codes of $C(N_1, 0)$, $C(N_1, 1)$, $C(N_1, 2)$, . . . , and $C(N_1, N_1-1)$ under the spreading factor $N_1$.

The spreading factor $N_1$ may be a newly selected one. That is, prior to step 220, the first telecommunications apparatus may be using another spreading factor $N_0$. Before performing steps 220 and 240, the first telecommunications apparatus may select the new spreading factor $N_1$, and then select the Q spreading codes under the newly selected spreading factor $N_1$. If the first telecommunications apparatus allocates every Q of the $N_1$ spreading codes to P second telecommunications apparatuses, the first telecommunications apparatus may be able to serve $(P/Q) \times N_1$ second telecommunications apparatuses. In other words, the first telecommunications apparatus may be able change the effective code resource from $N_0$ to $(P/Q) \times N_1$. As long as $(P/Q) \times N_1$ is greater than $N_0$, i.e. $(P/Q) > (N_0/N_1)$, the effective code resource is increased. The increment allows the first telecommunications apparatus to serve more second telecommunications apparatuses than before.

Alternatively, the spreading factor $N_1$ may be an originally used one. That is, prior to step 220, the first telecommunications apparatus is already using the spreading factor $N_1$. Therefore, before performing steps 220 and 240, the first telecommunications apparatus may need to select the Q spreading codes under the originally used spreading factor $N_1$. If the first telecommunications apparatus allocates every Q of the $N_1$ spreading codes to P second telecommunications apparatuses, it may be able to serve $(P/Q) \times N_1$ second telecommunications apparatuses. As long as $(P/Q)$ is greater than one, i.e. $P > Q$, the effective code resource is increased by $(P/Q)$ times. This increment allows the first telecommunications apparatus to serve more second telecommunications apparatuses than before.

More generally, the first telecommunications apparatus may be using spreading factor $N_0$ in original. The first telecommunications apparatus may then allocate $Q_1$ of $N_1$ spreading codes to $P_1$ second telecommunications apparatuses, $Q_2$ of $N_2$ spreading codes to $P_2$ second telecommunications apparatuses, . . . , and $Q_x$ of $N_x$ spreading codes to $P_x$ second telecommunications apparatuses, where each of these variables is an integer greater than $-1$ and x is number of the allocation groups. The effective code resource is $$N_0 - \sum_{i=1}^{x} \frac{N_0}{N_i} Q_i \sum_{i=1}^{x} P_i.$$

Figure 3:
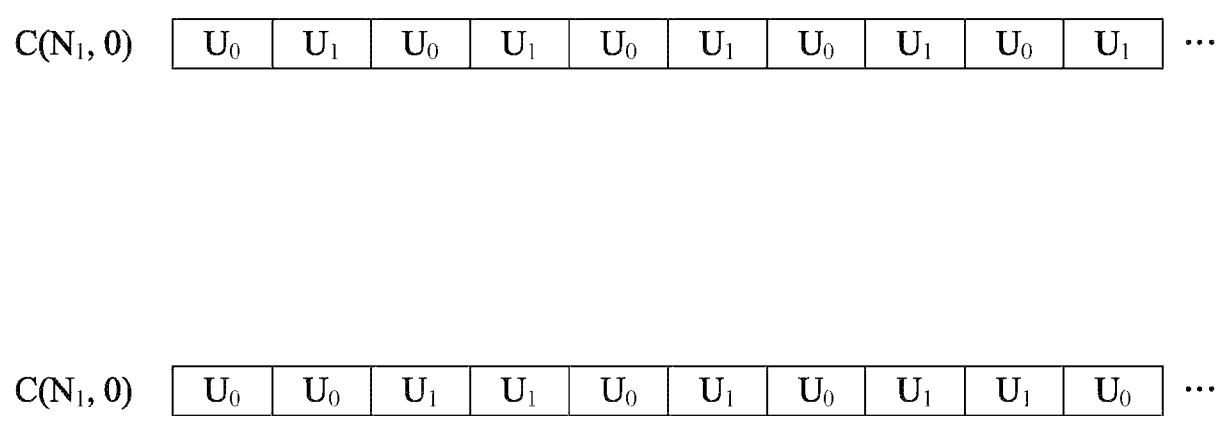
Figure 4:
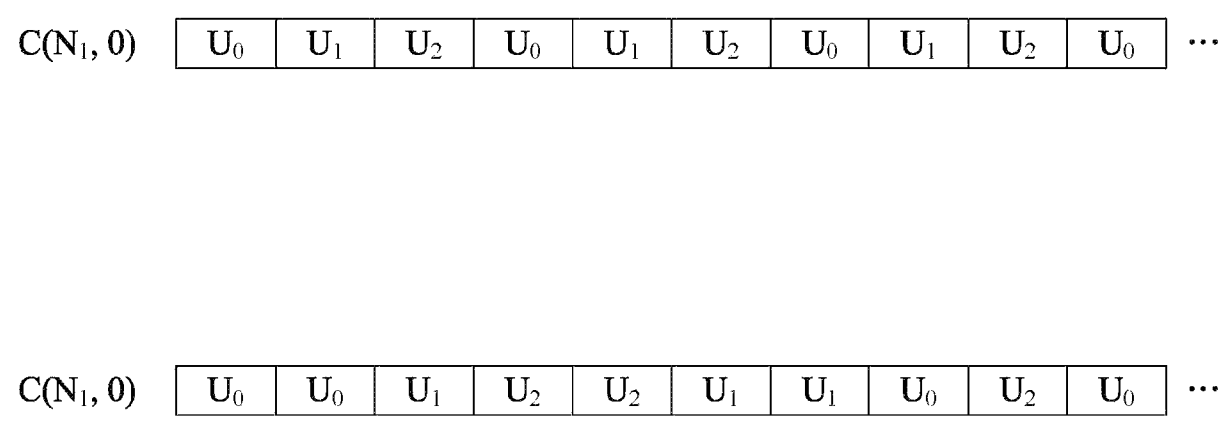

FIG. 3, and FIG. 4 show several examples illustrating how P second telecommunications apparatuses may share Q spreading codes in a TDM manner. For the sake of simplicity, user index of $U_0$, $U_1$, $U_2$, . . . , and $U_{P-1}$ are used in the figures to represent the P second telecommunications apparatuses, respectively. In addition, code index of $C(N_1, 0)$, $C(N_1, 1)$, $C(N_1, 2)$, . . . , and $C(N_1, Q-1)$ are used in the figures to represent the Q spreading codes, respectively. Furthermore, a rectangle encompassing a user index is used to represent a time interval, i.e. a turn, allocated to the second telecommunications apparatus that the encompassed user index corresponds to.

In any of the figures, if the P second telecommunications apparatuses share the Q spreading codes by frame-based allocation, each of the rectangles in the figure will correspond to one or a plurality of frames, each of which contains 38,400 chips of spread data. In other words, the minimum time interval, i.e. the minimum turn, for the first telecommunications apparatus to allocate to any of the P second telecommunications apparatuses is an integer amount of frames. Alternatively, in any of the figures, if the P second telecommunications apparatuses share the Q spreading codes by slot-based allocation, each of the rectangles in the figure will correspond to one or a plurality of slots, each of which contains 2,560 chips of spread data. In other words, the minimum time interval, i.e. the minimum turn, for the first telecommunications apparatus to allocate to any of the P second telecommunications apparatuses is an integer amount of slots.

Please refer to FIG. 3, which shows two examples of two second telecommunications apparatuses sharing one spreading code, i.e. P=2 and Q=1. In the upper example depicted in the figure, the first telecommunications apparatus allocates turns to the two second telecommunications apparatuses in a regular manner. In the lower example depicted in the figure, the first telecommunications apparatus allocates turns to the two second telecommunications apparatuses in an irregular manner.

Please refer to FIG. 4, which shows two examples of three second telecommunications apparatuses sharing one spreading code, i.e. P=3 and Q=1. In the upper example depicted in the figure, the first telecommunications apparatus allocates turns to the three second telecommunications apparatuses in a regular manner. In the lower example depicted in the figure, the first telecommunications apparatus allocates turns to the three second telecommunications apparatuses in an irregular manner.

Figure 5:
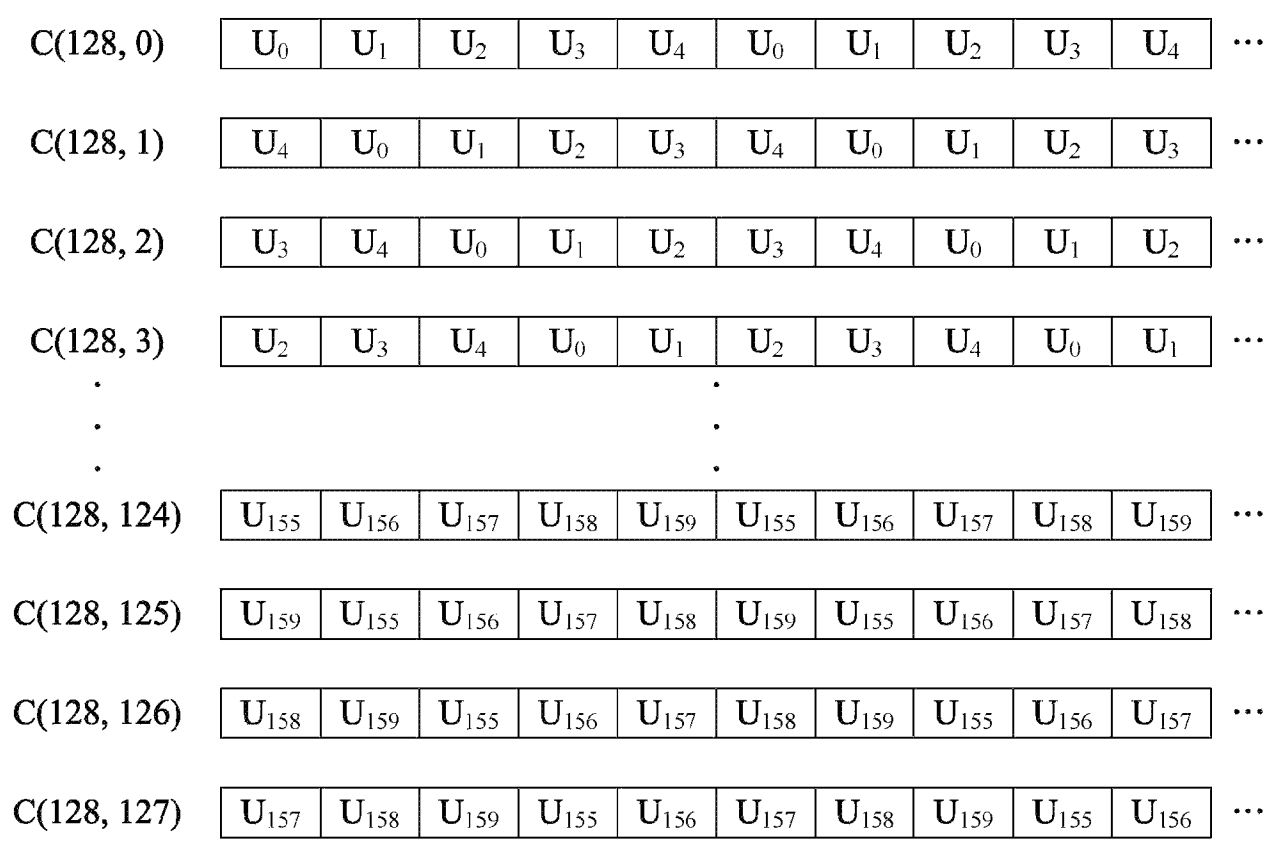
Figure 7:
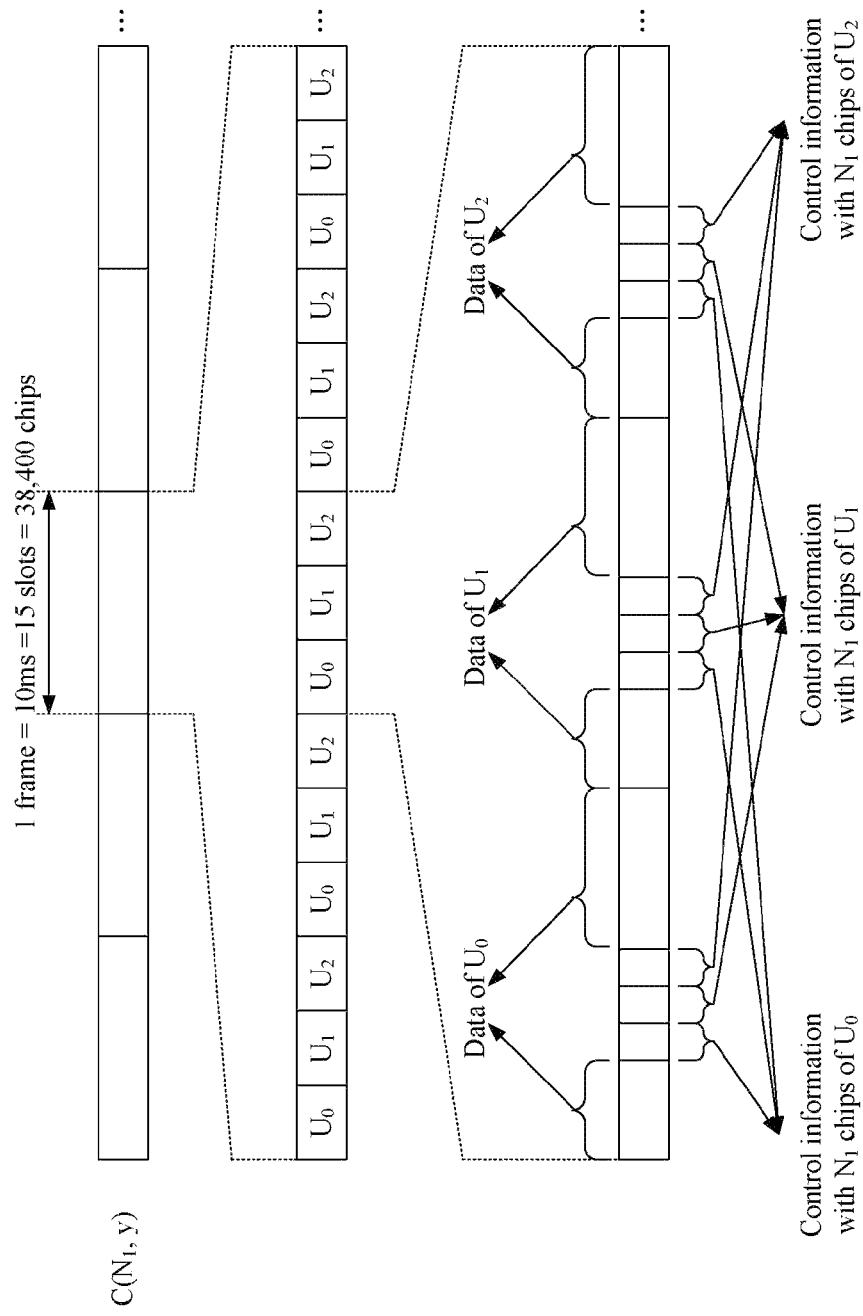

FIG. 5, FIG. 6, and FIG. 7 show some other examples illustrating how several second telecommunications apparatuses may share several spreading codes in a TDM manner. Please refer to FIG. 5 and FIG. 6, which show two examples of every five second telecommunications apparatuses sharing every four spreading codes of SF 128, i.e. P=5 and Q=4. In the example shown in FIG. 5, the first telecommunications apparatus allocates turns of each shared spreading code to the five sharing second telecommunications apparatuses in a regular manner. In the example shown in FIG. 6, the first telecommunications apparatus allocates turns of each shared spreading code to the five sharing second telecommunications apparatuses in an irregular manner.

For each of the Q spreading codes, the first telecommunications apparatus may use the spreading code to spread a control information symbol for each of the P second telecommunications apparatuses by turns into each slot of the spreading code. Each of the P second telecommunications apparatuses may then use the spreading code to de-spread a control information symbol from each slot transmitted using the spreading code. FIG. 7 shows an example of three second telecommunications apparatuses sharing one spreading codes with spreading factor $N_1$, i.e. P=3 and Q=1 by slot-based allocation. The three second telecommunications apparatuses are User 0, User 1, and User 2 and are designated as $U_0$, $U_1$, and $U_2$ in the figure. They use slots of spreading code $C(N_1, y)$ in turn for data symbol transmission, where y is an integer between 0 and $N_1-1$. For some situation, the control information is to be transmitted per slot for each user. In such case, an additional level of TDM may be introduced within each slot. As shown in FIG. 7, in each slot, there are always one control information symbol with $N_1$ chips of User 0, another one of User 1, and the other one of User 2. Other spreading code sharing schemes may apply arrangements similar to the one depicted in FIG. 7.

Figure 8:
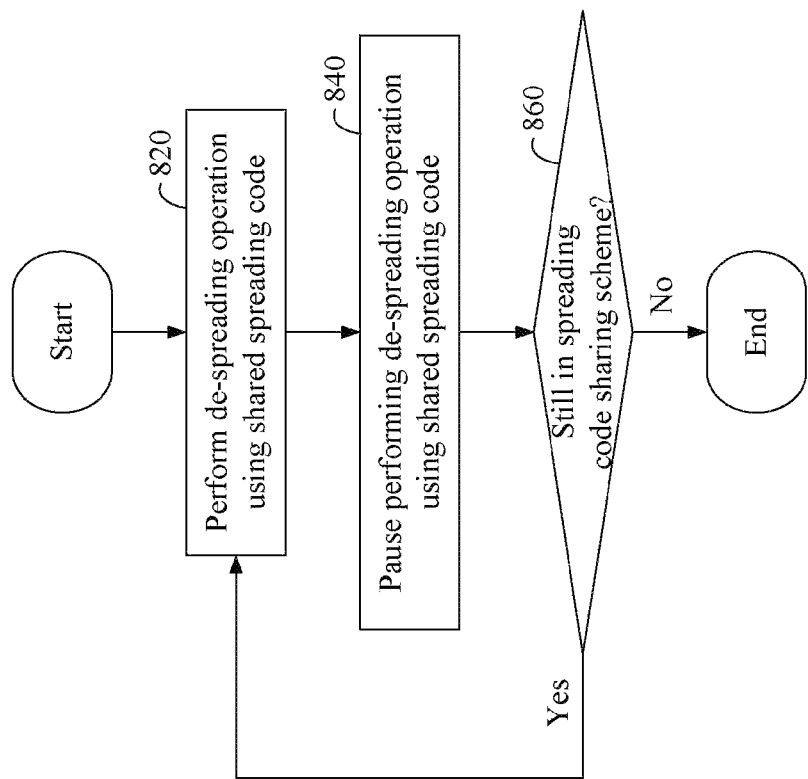
FIG. 8 shows an exemplary flowchart of a method that a second telecommunications apparatus may perform according to an embodiment of the invention.

FIG. 8 shows an exemplary flowchart of a method a second telecommunications apparatus in a spreading code sharing scheme performs according to an embodiment of the invention. In the spreading code sharing scheme, the second telecommunications apparatus is sharing at least one spreading code with at least another second telecommunications apparatus.

First, at step 820, the second telecommunications apparatus performs a de-spreading operation using a shared spreading code. Then, at step 840, the second telecommunications apparatus pauses performing the de-spreading operation using the shared spreading code. Specifically, the second telecommunications apparatus performs step 820 for the slot(s)/frame(s) of spread data allocated to itself, and performs step 840 for the slot(s)/frame(s) of spread data allocated to other(s) sharing the same spreading code. Please note that the order of these two steps may be interchanged, i.e. step 840 may be the first step and then followed by step 820. In addition to steps 820 and 840, if each of the slots transmitted using the spreading code contains chips that represent one control information symbol designated for the second telecommunications apparatus, the second telecommunications apparatus may need to de-spread the control information symbol from each of the slots.

At step 860, the second telecommunications apparatus determines whether it's still in the spreading code sharing scheme. If the answer is yes, the second telecommunications apparatus goes back to step 820 (or step 840 if step 840 is before 820) to repeat steps 820 and 840. Otherwise, the second telecommunications apparatus ends the process. After ending the process, the second telecommunications apparatus may perform the de-spreading operation continually using the spreading code if the spreading code is allocated to itself exclusively. Alternatively, after ending the process, the second telecommunications apparatus may stop performing the de-spreading operation using the spreading code if it's neither using the spreading code exclusively nor sharing the spreading code with other(s).

If the second telecommunications apparatus is sharing several spreading codes with other(s), the second telecommunications apparatus may need to perform the method depicted in FIG. 8 for each of the shared spreading code. Using FIG. 5 and FIG. 6 as examples, if the second telecommunications apparatus's user index is one of $U_0$, $U_1$, $U_2$, $U_3$, and $U_4$, the second telecommunications apparatus may need to perform the method of FIG. 8 for spreading code $C(N_1, 0)$, for spreading code $C(N_1, 1)$, for spreading code $C(N_1, 2)$, and for spreading code $C(N_1, 3)$.

The methods discussed above allow the first telecommunications apparatus to adjust the effective code resource in order to serve a varying amount of second telecommunications apparatuses. Even without using secondary scrambling codes, the first telecommunications apparatus may be able to serve more second telecommunications apparatuses it otherwise would not be able to serve. When secondary scrambling codes are not used, potential interference resulted from the use of secondary scrambling codes is avoided. In addition, because the first telecommunications apparatus may determine the value of P and Q according to the actual requirements, and may even have different groups of spreading code sharing scheme simultaneously, the methods may allow the first telecommunications apparatus to allocate the available resources dynamically and more efficiently.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A telecommunications method performed by a first telecommunications apparatus, comprising:
   selecting a plurality of second telecommunications apparatuses to share at least one spreading code; and
   using each of the at least one spreading code to perform spreading operations for the selected second telecommunications apparatuses by turns repetitively, wherein the number of the selected second telecommunications apparatuses is greater than a spreading factor, and the turns are allocated to the selected second telecommunications apparatuses in an irregular manner.

2. The telecommunications method of claim 1, wherein the first telecommunications apparatus and the second telecommunications apparatuses are WCDMA telecommunications apparatuses.

3. The telecommunications method of claim 1, wherein each of the turns corresponds to at least one slot of 2,560 chips.

4. The telecommunications method of claim 1, wherein each of the turns corresponds to at least one frame of 38,400 chips.

5. A telecommunications method performed by a telecommunications apparatus in a spreading code sharing scheme, comprising:
   performing a de-spreading operation using a spreading code;
   pausing performing the de-spreading operation using the spreading code; and
   repeating the steps of performing the de-spreading operation and pausing performing the de-spreading operation until the telecommunications apparatus leaves the spreading code sharing scheme;
   wherein in the spreading code sharing scheme, the telecommunications apparatus shares the spreading code with at least another telecommunications apparatus, and the telecommunications apparatus and the at least another telecommunications apparatus take turns in an irregular manner to use the spreading code.

6. The telecommunications method of claim 5, wherein the telecommunications apparatus is a WCDMA telecommunications apparatus.

7. The telecommunications method of claim 5, wherein in the spreading code sharing scheme, the telecommunications apparatus is sharing the spreading code with the at least another telecommunications apparatus in a TDM manner.

8. The telecommunications method of claim 5, wherein the step of performing the de-spreading operation using the spreading code comprises:

performing the de-spreading operation using the spreading code for at least one slot of 2,560 chips.

9. The telecommunications method of claim 5, wherein the step of performing the de-spreading operation using the spreading code comprises:

performing the de-spreading operation using the spreading code for at least one frame of 38,400 chips.

\* \* \* \* \*